United States Patent [19]
Sandell et al.

[11] Patent Number: 5,793,742
[45] Date of Patent: *Aug. 11, 1998

[54] PROTECTIVE CARTRIDGE FOR REWRITABLE OPTICAL DISK

[75] Inventors: Patrick Sandell, Barrington; Mohamed Agha, Hoffman Estates, both of Ill.

[73] Assignee: Opticord, Inc., Palatine, Ill.

[*] Notice: This patent issued on a continued prosecution application filed under 37 CFR 1.53(d), and is subject to the twenty year patent term provisions of 35 U.S.C. 154(a)(2).

[21] Appl. No.: 909,237

[22] Filed: Aug. 11, 1997

Related U.S. Application Data

[63] Continuation of Ser. No. 505,370, Jul. 21, 1995, abandoned, which is a continuation of Ser. No. 210,872, Mar. 18, 1994, abandoned.

[51] Int. Cl.[6] .................... G11B 5/84; G11B 23/03
[52] U.S. Cl. .......................... 369/291; 360/133
[58] Field of Search ........................ 369/291, 290, 369/77.2, 78; 360/133, 60; 206/309, 344, 312; 220/326

[56] References Cited

U.S. PATENT DOCUMENTS

| | | | |
|---|---|---|---|
| 4,669,078 | 5/1987 | Ogusu | 369/291 |
| 4,702,369 | 10/1987 | Philosophe | 206/312 |
| 4,746,013 | 5/1988 | Suzuki et al. | 206/309 |
| 4,908,817 | 3/1990 | Sandell et al. | 369/291 |
| 5,268,808 | 12/1993 | Childers | 369/291 |
| 5,579,297 | 11/1996 | Childers et al. | 369/291 |

*Primary Examiner*—Allen Cao
*Attorney, Agent, or Firm*—Leydig, Voit & Mayer, Ltd.

[57] ABSTRACT

A rewritable optical disk is protectively enclosed in a cartridge having a base and having a hinged cover which is swingable to an open position permitting removal of the disk from the cartridge. A door with shutters is slidable on the cartridge between open and closed positions relative to access apertures formed in the cover and the base. The shutter for the access aperture in the cover is hinged relative to the remainder of the sliding door to enable that shutter to swing as the cover is opened and closed. The cover carries an axially and radially floatable hub which coacts with the optical disk and the spindle of the disk drive to establish a precisely concentric relation between the disk and the spindle.

26 Claims, 7 Drawing Sheets

PROTECTIVE CARTRIDGE FOR REWRITABLE OPTICAL DISK

This is a continuation of application Ser. No. 08/505,370 filed on Jul. 21, 1995, now abandoned, which was a continuation of Ser. No. 08/210,872 filed Mar. 18, 1994, now abandoned.

BACKGROUND OF THE INVENTION

The present invention relates generally to cartridges for data information disks. The invention relates more particularly to cartridges for protecting rewritable optical disks used for mass storage of alphanumeric data which may be accessed by a computer. Such a disk is preferably enclosed within a cartridge to prevent the disk from being scratched or nicked during handling. In use, the cartridge containing the disk is inserted into a disk drive having an optical reader/writer and thereafter a sliding door on the cartridge is opened to expose portions of the disk to the reader/writer.

A cartridge of this general type is disclosed in Sandell et al U.S. Pat. No. 4,908,817. The cartridge of that patent comprises a pair of interlocking shells which define a compartment containing the disk. The sliding door is generally U-shaped and is formed in part by a pair of shutters which normally close access apertures formed in opposite sides of the cartridge. When the door is slid open, the shutters open the access apertures. Upon opening of the apertures, one side of the disk is exposed to a rotary drive spindle of the disk drive and to a laser for reading and writing data on the disk. The other side of the disk is exposed to a magnetic head for erasing data from the disk.

The Sandell et al cartridge is disadvantageous in that, for all practical purposes, the disk becomes a permanent part of the cartridge and cannot be easily removed from the cartridge and replaced with another disk. Suzuki et al U.S. Pat. No. 4,746,013 discloses a cartridge with a hinged cover which may be opened to permit removal and replacement of a compact disc. That cartridge, however, is adapted for use only with a read-only memory (ROM) compact disc and cannot be used with an erasable or rewritable optical disk since the hinged cover does not include a shuttered aperture capable of providing access to an erasing head.

When the disk contains alphanumeric data, it is necessary that the disk rotate precisely about a predetermined axis in order to maintain a precise relationship between the disk and the read/write laser. In the cartridge of the Sandell et al patent, apertured metal hubs are glued to opposite sides of the disk and coact with the spindle and the magnetic pulley assembly of the disk drive to cause the disk to rotate precisely and concentrically about the axis of the spindle with virtually no run-out. It is tedious, time-consuming and expensive, however, to affix the hubs to the disk. Moreover, the hubs must be assembled to the disk with great positional accuracy and, in many cases, this is not achieved in mass assembly procedures and thus a relatively large number of disks must be scrapped.

SUMMARY OF THE INVENTION

An important object of the present invention is to provide a protective cartridge which is capable of being easily used with different optical disks and which also is capable of permitting erasure and rewriting of the disks.

A more detailed object is to achieve the foregoing by providing a cartridge having a hinged cover which may be opened to permit removal and replacement of the disk, the cover being equipped with a slidable door having a shutter which also is hinged so as to be capable of swinging with the cover when the latter is opened.

Another important object of the invention is to provide a cartridge which facilitates the use of less expensive optical disks.

A related object is to provide a cartridge which eliminates the need of affixing permanent hubs to each disk.

A more specific object is to eliminate the permanent hubs on the disk by providing the hinged cover of the cartridge with a floating hub which coacts with the disk drive to effect rotation of the disk about a precisely predetermined axis.

Still another object of the invention is to provide a cartridge which is constructed to permit easy lifting of the disk from the cartridge without touching and damaging the data-containing portion of the disk.

The invention also resides in the relatively simple and inexpensive construction of the floating hub.

These and other objects and advantages of the invention will become more apparent from the following detailed description when taken in conjunction with the accompanying drawings.

3

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as embodied in a protective cartridge 20 for a rewritable optical disk 21. In some respects, the cartridge is similar to that of Sandell U.S. Pat. No. 4,908,817, the disclosure of which is incorporated herein by reference.

The cartridge 20 is especially adapted for use with a disk 21 having alphanumeric data recorded on one side thereof, the data herein being on the lower side of the disk. Such a disk is considered defective if any portion of the data encoded thereon cannot be faithfully reproduced. Accordingly, it has been recognized that for storing alphanumeric data on optical disks, the disk should be contained within a protective cartridge to prevent the disk from become scratched or pitted during handling.

Figure 2:
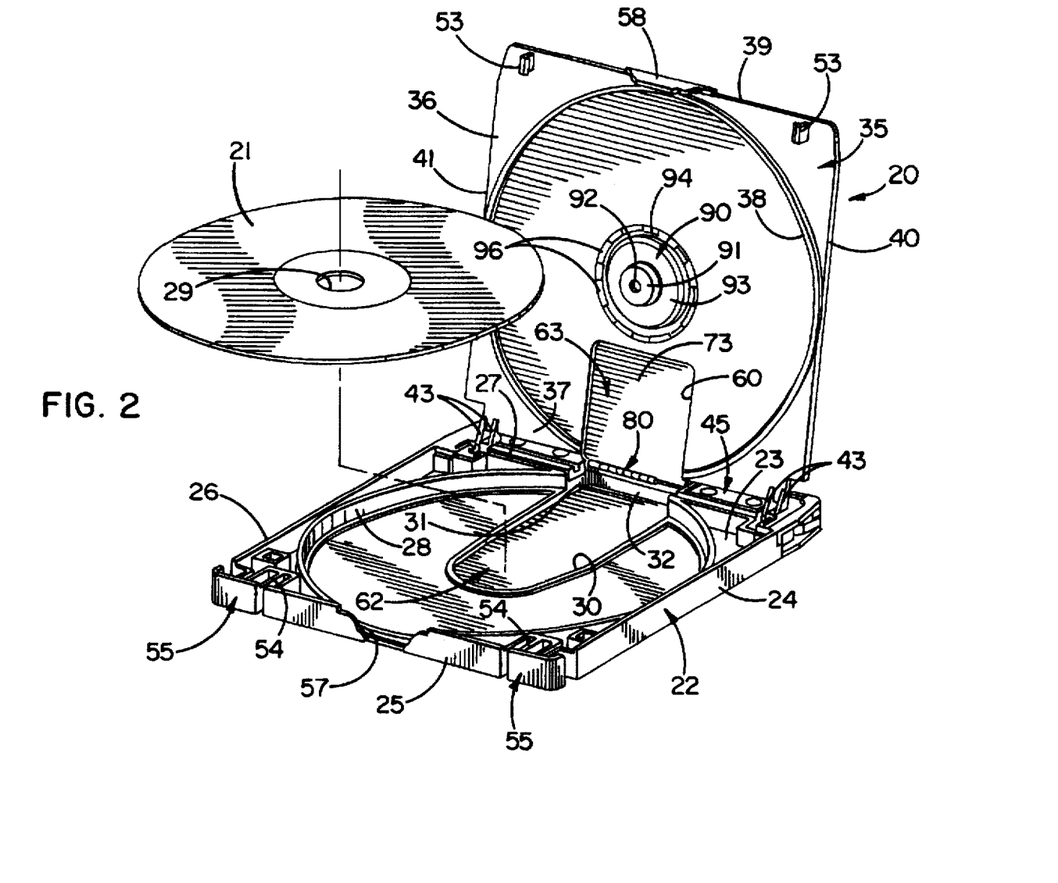
FIG. 2 is a view similar to FIG. 1 but shows the cover in an open position and shows an optical data information disk in exploded relation with the cartridge.

The present cartridge 20 includes a single-piece base 22 which is injection molded from transparent plastic enabling the disk 21 to be seen and identified through the base. The base is generally rectangular in shape and includes a bottom wall 23 (FIG. 2) and upstanding side walls 24, 25 and 26 extending along three of the margins of the bottom wall. A fourth upstanding side wall 27 is located adjacent the rear of the base but is spaced somewhat forwardly of the rear margin of the bottom wall. A generally circular wall or rib 28 is formed integrally with and extends upwardly from the bottom wall 23, is located inwardly of the side walls 24–27, and defines a pocket for the disk, the latter herein being a 4½" disk having approximately a 15 mm. hole 29 through the center thereof. Portions of the rib 28 are substantially tangent to portions of the side walls 24–27.

For a purpose to be explained subsequently, an access aperture 30 (FIGS. 2 and 3) is formed through the bottom wall 23 of the base 22. Herein, the access aperture is generally U-shaped and extends in a fore-and-aft direction along the bottom wall 23 from a point somewhat beyond the center of that wall, past a notch 31 in the side wall 27, and to another upstanding wall 32 spaced rearwardly from the wall 27. The access aperture 30 is adapted to be selectively opened and closed and, when open, exposes the lower side of the disk 21 to a rotary disk drive 33 (FIG. 17) and also to a laser head (not shown) for recording data on and reading data from the lower side of the disk.

In accordance with one aspect of the present invention, an apertured cover 35 is pivotally mounted on the base 22 to swing between open and closed positions and is uniquely constructed to expose the disk 21 to a magnetic head (not shown) for erasing data from the disk. By virtue of the swinging cover, the disk may be easily removed from the cartridge 20 and replaced with a different disk and, in addition, the disk may be erased and rewritten as a result of the cover being apertured and capable of exposing the disk to the erasing head.

Figure 10:
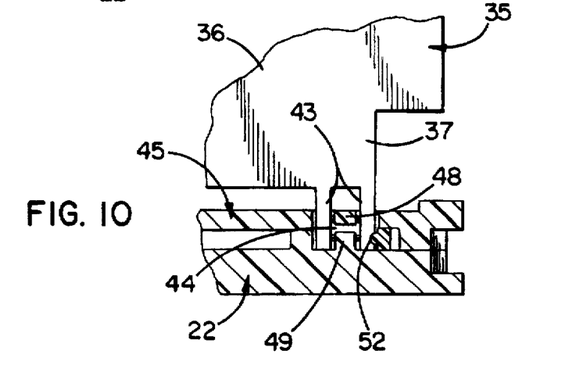
FIG. 10 is a view similar to FIG. 9 but shows the cover in an open position.
Figure 11:
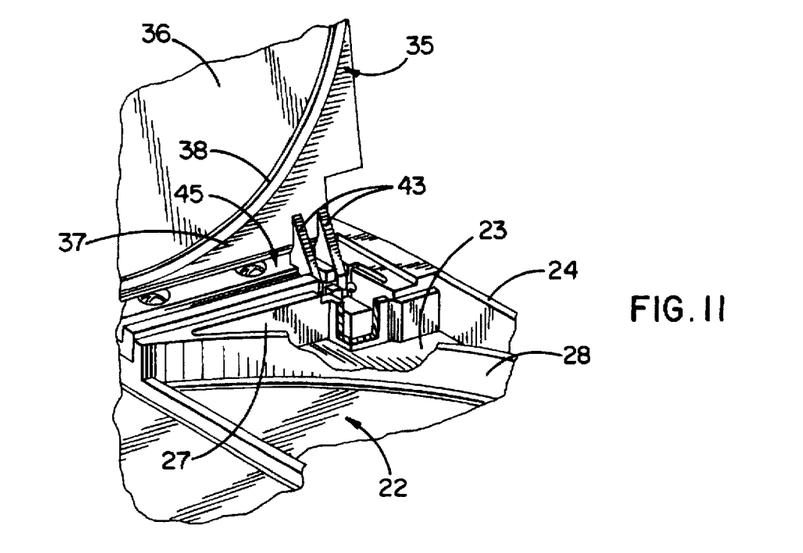
FIG. 11 is an enlarged fragmentary perspective view showing the cover in an open position.

More specifically, the cover 35 includes a generally rectangular plate 36 injection molded from transparent plastic and having a tongue-like mounting portion 37 (FIG. 10) near its rear margin. A circular rib 38 (FIG. 2) depends from the underside of the plate 36 and, when the cover 35 is closed, fits closely inside of the rib 28 of the base 22 to help define the pocket for the disk 21. When the cover is closed, the front or free edge 39 and the side edges 40 and 41 of the plate lie just inside of the walls 25, 24, and 26, respectively, while the top of the plate is substantially flush with the upper edges of such walls. Thus, the walls 24, 25 and 26 of the base 22 rather than the plate 36 dictate the outside configuration of the cartridge 20 and, since the walls can be easily molded to a controlled size and shape, the cartridge may be freely inserted into and removed from the disk drive.

Hinge means are provided for mounting the cover 35 for upward and downward swinging on the base 22 about a laterally extending axis between the closed and open positions of the cover. In this particular instance, the hinge means are defined in part by laterally spaced pairs of laterally spaced ears 43 (FIGS. 2 and 8–11), there being one pair of ears formed integrally with and projecting rearwardly from the mounting tongue 37 adjacent each end thereof. Near their free ends, the ears of each pair are bridged by a laterally extending cylindrical pin 44 (FIGS. 9 and 10) which is integral with the ears. The hinge axis of the cover 35 lies substantially along a line extending through the two hinge pins and is located substantially in the plane of the plate 36.

Figure 3:
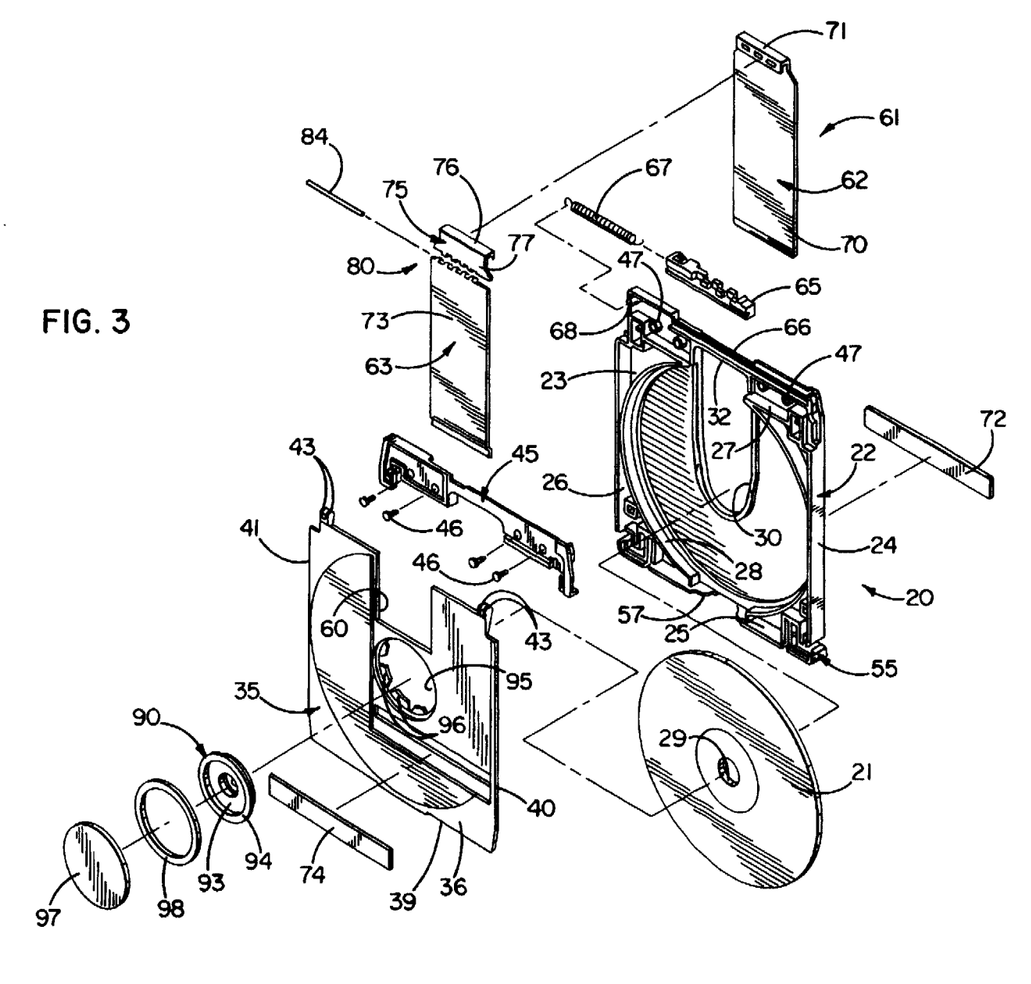
FIG. 3 is an exploded perspective view of the cartridge and the disk.

Overlying the rear marginal portion of the bottom wall 23 of the base 22 is a separately molded and laterally extending plastic strip 45 (FIG. 3). The latter is secured to the base 22 by four screws 46 which are threaded into bosses 47 projecting upwardly from the bottom wall 23 of the base. The bosses support the strip 45 in vertically spaced relation from the bottom wall 23 with the strip being located between the upstanding walls 27 and 32.

Each end portion of the strip 45 is formed with a finger 48 (FIGS. 8–10) which projects forwardly between the ears 43 on the adjacent end portion of the cover 35 and overlies the hinge pin 44 that spans such ears so as to captivate the pin against upward movement. A tab 49 is formed integrally with and projects upwardly from the bottom wall 23 and extends between each pair of ears at the forward side of the hinge pin in order to captivate the pin against forward movement.

With the foregoing arrangement, the cover 35 is assembled with the base 22 by placing the cover flat on the base with the hinge pins 44 located just rearwardly of the tabs 49. The strip 45 then is attached to the base 22 by the screws 46 to cause the fingers 48 to overlie the hinge pins 44. Engagement of the rear ends of the ears 43 with notches 50 (FIG. 8) formed in the strip 45 on opposite sides of each finger 48 limit rearward movement of the hinge pins. Thus, the hinge pins are captivated against bodily movement relative to the base 22 but may pivot on the base to enable the cover 35 to swing between its closed and open positions.

Figure 9:
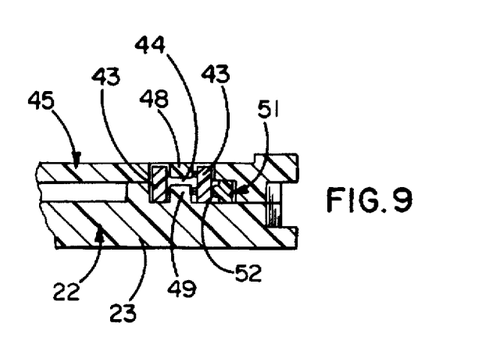
FIG. 9 is an enlarged fragmentary cross-section taken substantially along the line 9—9 of FIG. 8 and shows the cover in a closed position.

Means are provided for releasably holding the cover 35 in an upright open position in order to facilitate insertion of the disk 21 into and removal of the disk from the base 22. In this instance, such means comprise resiliently yieldable and cantilevered fingers 51 (FIGS. 8–10) molded integrally with the plastic strip 45 adjacent the outboard ear 43 of each pair of ears, each finger having a latching nib 52 on its free end. When the cover 35 is in its closed position as shown in FIG. 9, each nib 52 resiliently engages the outboard side of the adjacent outboard ear 43. As the cover approaches its open position, each nib snaps to a latched position located in engagement with the forward side of the outboard ear (see FIG. 10) and thus releasably holds the cover upright to facilitate replacement of the disk. As the cover is manually swung downwardly, the ear cams against the nib to flex the cantilevered finger 51 outwardly and thereby release the nib from latching engagement with the ear in order to permit closing of the cover.

Figure 6:
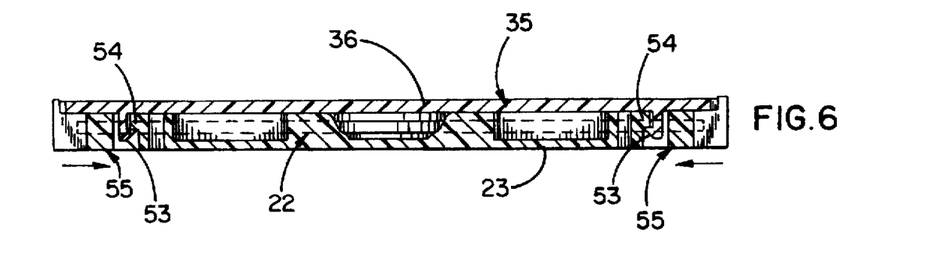
FIG. 6 is an enlarged fragmentary cross-section taken substantially along the line 6—6 of FIG. 4 and shows the cover in a latched condition.
Figure 7:
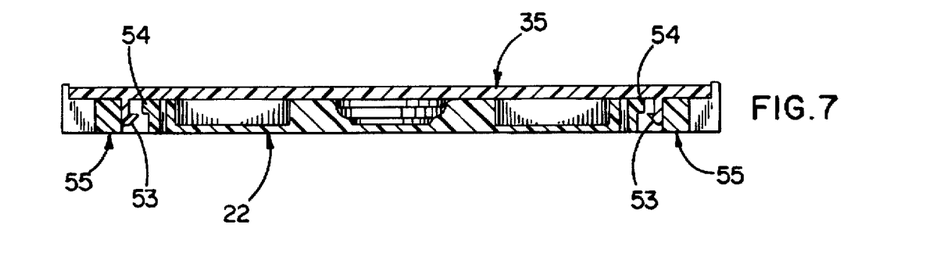
FIG. 7 is a view similar to FIG. 6 but shows the cover in an unlatched condition.
Figure 8:
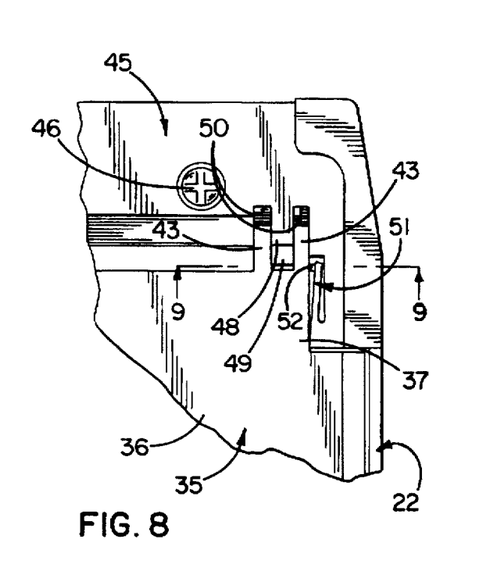
FIG. 8 is an enlarged view of certain components shown in FIG. 4.

The cover 35 is releasably held in its closed position by a pair of laterally spaced latches 53 (FIGS. 2, 6 and 7) molded integrally with and depending from the underside of the cover near the free edge 39 thereof. When the cover is closed, each latch hooks beneath a ledge 54 which forms part of a finger tab unit 55. Each finger tab unit is integral with the base 22 near a forward corner thereof and is resiliently cantilevered so as to be capable of flexing laterally relative to the base. When the cover 35 is in its closed position, each finger tab unit 55 is in a relaxed state and, under such conditions, the latch 53 hooks beneath the ledge 54 as shown in FIG. 6. By squeezing the two finger tab units 55 between the thumb and finger of one hand, the tab units are flexed inwardly to move the ledges 54 inwardly from beneath the latches 53 as shown in FIG. 7 and thereby permit opening of the cover 35. As the cover is swung closed, the latches engage the ledges and momentarily cam the finger units outwardly to allow the latches to pass by the ledges, after which the finger units spring inwardly to cause the ledges to move into hooking engagement with the latches.

Advantageously, provision is made to enable the disk 21 to be easily lifted out of the base 22 without touching the data-containing portion of the disk. To this end, a generally V-shaped notch 57 (FIG. 2) is formed in the center portion of the wall 25 of the base 22 and in the adjacent portion of the circular rib 28. The notch defines an opening into which a thumb may be inserted for purposes of placing the thumb into engagement with the outer peripheral edge of the disk. By placing a forefinger in the hole 29 of the disk, the disk may be lifted out of the base without touching the data-containing portion of the disk.

Figure 1:
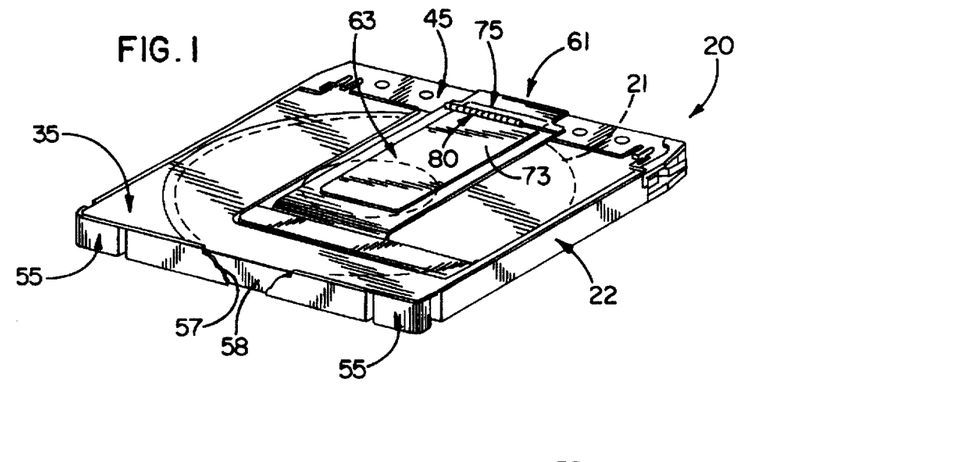
FIG. 1 is a perspective view of a new and improved protective cartridge incorporating the unique features of the present invention, the cover of the cartridge being shown in a closed position.

When the cover 35 is in its closed position, the notch 57 is closed off in order to prevent dirt and other contamination from entering the cartridge 20. For this purpose, a generally V-shaped shield 58 (FIGS. 1 and 2) is formed integrally with and depends from the central portion of the free edge 39 of the cover. When the cover is closed, the shield 58 slips into that portion of the notch 57 formed in the wall 25 of the base 22 and closes off the notch to protect against entry of dirt and the like. The outer side of the shield 58 is substantially flush with the outer side of the wall 25 when the cover is in its closed position.

Figure 5:
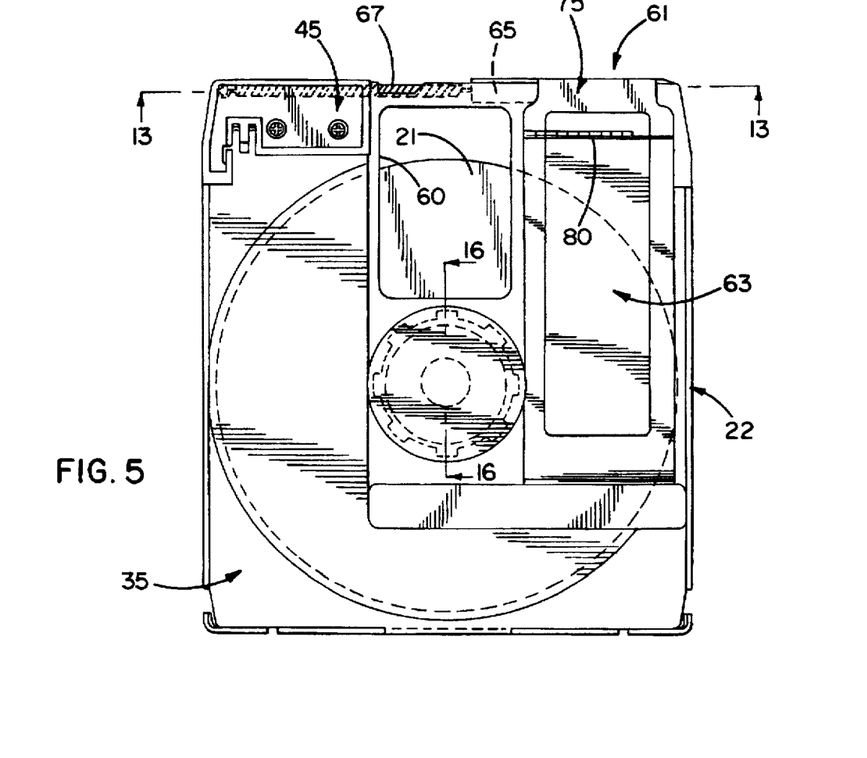
FIG. 5 is a view similar to FIG. 4 but shows the door in an open position.

In carrying out the invention, an access aperture 60 (FIGS. 2, 3 and 5) is formed through the swingable cover 35 in order to enable the disk 21 to be exposed to the magnetic head for erasing data from the disk. As shown most clearly in FIG. 3, the access aperture 60 is generally rectangular and extends forwardly from the central portion of the rear edge of the cover to a location somewhat short of the center of the cover.

Further in keeping with the invention, the access apertures 30 and 60 are adapted to be selectively opened and closed by a slidable door 61 having shutters 62 and 63 (FIG. 3) which, when the door is closed, cover the access apertures 30 and 60, respectively. The door 61 is particularly characterized in that the shutter 63 not only is capable of sliding relative to the cover 35 between open and closed positions of the door but also is capable of swinging with the cover when the latter is opened for purposes of replacing the disk 21.

Figure 12:
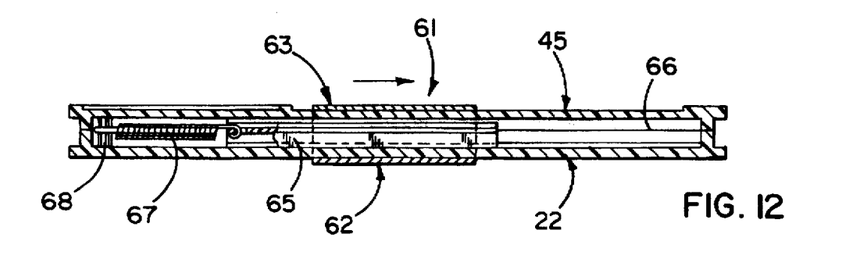
FIG. 12 is an enlarged cross-section taken substantially along the line 12—12 of FIG. 4.
Figure 13:
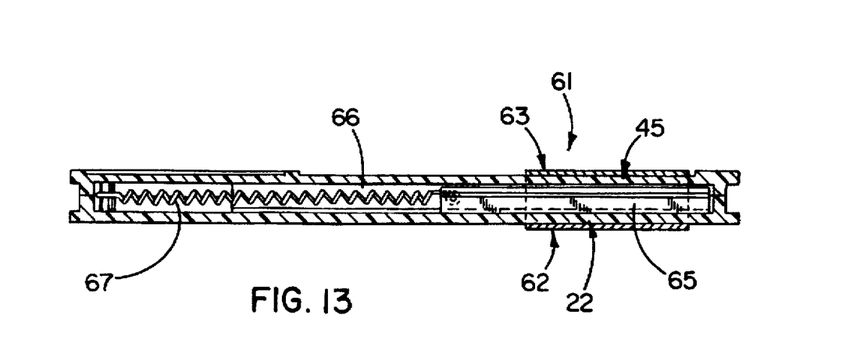
FIG. 13 is an enlarged fragmentary cross-section taken substantially along the line 13—13 of FIG. 5.

More specifically, the door 61 includes a mounting portion which includes a slider 65 in the form of an elongated plastic member (FIG. 3) which is guided for lateral movement in a channel-like track 66 at the rear end of the cartridge 20. The track is defined between the upper side of the bottom wall 23 of the base 22 and the lower side of the plastic strip 45. The slider 65 for the door 61 is essentially the same as disclosed in the aforementioned Sandell et al patent and need not be described in detail. It will suffice to say that the slider is guided in the track to slide laterally between a door-closed position shown in FIG. 12 and a door-open position shown in FIG. 13. A contractile spring 67 is connected between one end of the slider and a fixed pin 68 adjacent one end of the track and acts to urge the slider toward its door-closed position.

Figure 14:
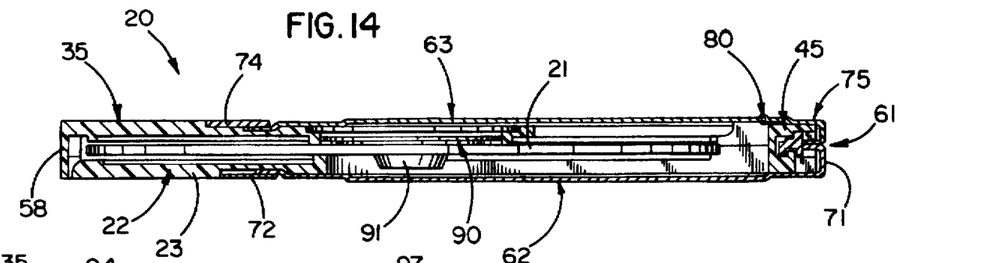
FIG. 14 is an enlarged fragmentary cross-section taken substantially along the line 14—14 of FIG. 4 and shows the cover in a closed position.
Figure 15:
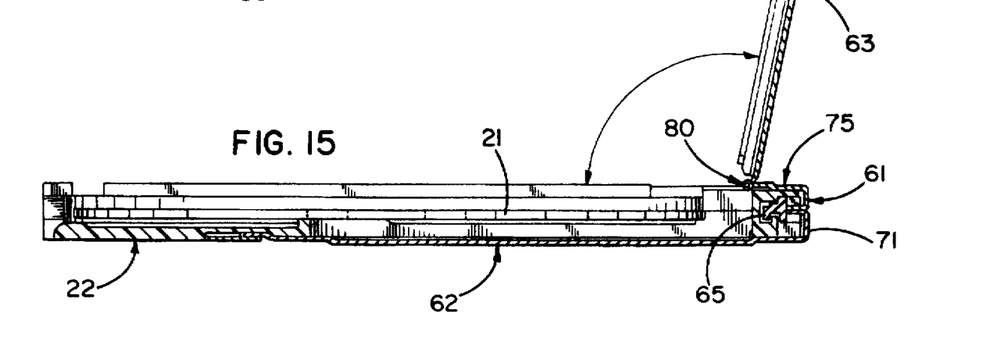
FIG. 15 is a view similar to FIG. 14 but shows the cover in an open position.

The shutter 62 of the door 61 also is essentially the same as disclosed in the Sandell et al patent and is defined by a generally rectangular plate 70 (FIG. 3) of sheet metal (e.g., stainless steel) located in underlying relation with the bottom wall 23 of the base 22. The rear edge of the shutter 62 is formed with a channel-like mounting portion 71 which is attached rigidly to the slider 65 in the manner disclosed in the Sandell et al patent. In order to guide the forward edge portion of the shutter and to prevent such edge portion from being bent away from the base 22, a sheet metal retainer strip 72 (FIGS. 3 and 14) overlaps the forward edge portion of the shutter and is cemented to ledges formed in the lower side of the base.

The shutter 63 for the upper aperture 60 also includes a generally rectangular stainless steel plate 73 (FIG. 3) which overlies the upper side of the plate 36 of the cover 35 and whose lower edge portion is slidably guided by a retainer strip 74 secured to the plate 36. The plate 73 of the shutter 63, however, is not attached directly to the plastic slider 65 but instead is attached (in a manner to be described subsequently) to a stainless steel mounting member or bracket 75 which, in turn, is attached to the slider and which, for practical purposes, forms part of the slider. The rear of the mounting bracket 75 is formed with a channel-shaped mounting portion 76 which is attached rigidly to the plastic slider 65 in the same manner as the mounting portion 71 of the shutter 62. Formed integrally with and extending forwardly from the mounting portion 76 of the bracket 75 is a tongue 77.

Hinge means 80 connect the rear edge of the plate 73 of the shutter 63 to the forward edge of the tongue 77 of the mounting bracket 75 and support the shutter 63 for swinging upwardly and downwardly with the cover 35 about an axis coinciding substantially with the hinge axis of the cover. In this instance, the hinge 80 is defined by a series of interleaved curls (see FIG. 3) formed along adjacent edges of the shutter plate 73 and the bracket tongue 77. In addition, the hinge includes a cylindrical hinge pin 84 which extends laterally through the curls so as to pivotally connect the shutter 63 to the bracket 75.

Figure 4:
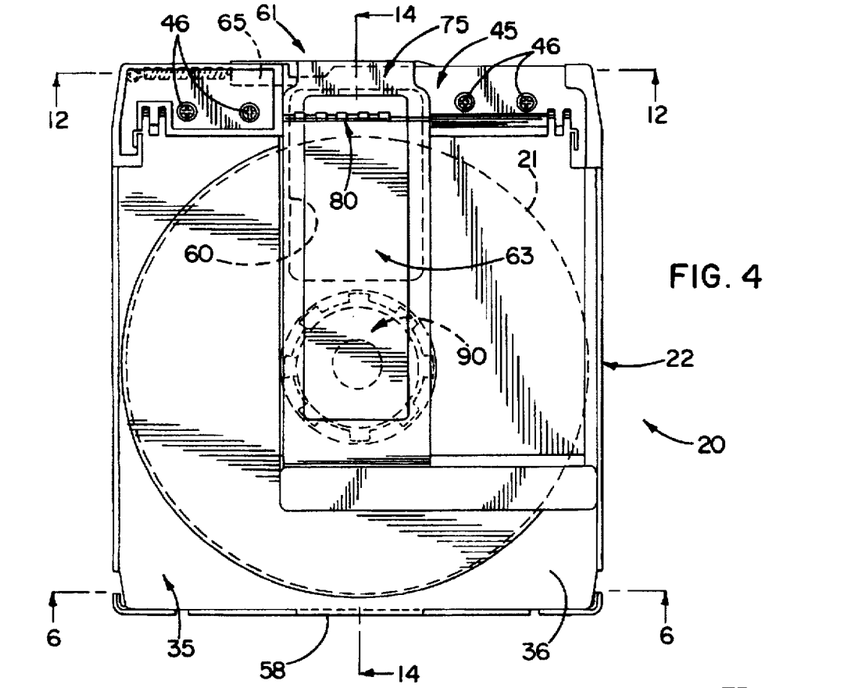
FIG. 4 is a top plan view of the cartridge and shows the sliding door of the cartridge in a closed position.

Normally, the door 61 is disposed in a closed position (FIGS. 1 and 4) in which the shutters 62 and 63 cover the access apertures 30 and 60, respectively, to protect the disk 21 against contamination. When the cartridge 20 is inserted into the disk drive 33, a pivoted actuator arm (not shown) engages the slider 65 and moves the latter to the position shown in FIG. 13 in order to open both shutters simultaneously and thereby expose the access apertures 30 and 60 (see FIG. 5). As explained above, the open aperture 30 exposes the disk 21 to the read/write head while the open aperture 60 exposes the disk to the erase head. In an overall sense, therefore, the present cartridge 20 functions in the disk drive 33 itself in the same manner as the cartridge of the Sandell et al patent. The present cartridge is particularly advantageous, however, in that the hinged shutter 63 of the sliding door 61 enables the cover 35 to be hinged to the base 22 and swung to an open position facilitating easy replacement of the disk 21.

Figure 17:
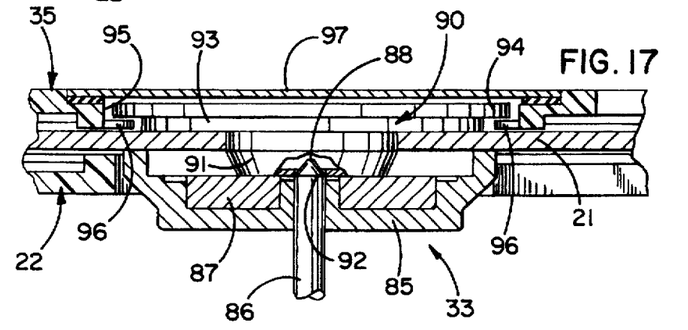
FIG. 17 is a view similar to FIG. 16 but shows the cartridge fully inserted into the disk drive.

The disk drive 33 is shown in detail in FIG. 17 and comprises a rotary pulley assembly 85, a spindle 86 which rotates in unison with the pulley assembly and an annular magnet 87 which is adhesively bonded to the pulley assembly. The upper end portion of the spindle is defined by a tapered tip 88.

In accordance with a further aspect of the invention, the cover 35 of the cartridge 20 is equipped with a floating aligner 90 which allows a precisely centered relation to be established between the axis of the disk 21 and the axis of the spindle 86 when the cartridge is inserted into the disk drive 33. By virtue of the aligner 90 being built into the cover 35, the significant expense of gluing or otherwise securing separate alignment hubs to the disk 21 itself is eliminated.

In this particular instance, the aligner 90 includes a steel hub 91 (FIGS. 16 and 17) of circular cross-section and having a downwardly tapered and frustoconical lower end portion and a cylindrical upper end portion. The cylindrical upper end portion of the hub is sized to telescope snugly and precisely into the hole 29 in the disk 21. Formed in the axially facing lower end of the hub 91 is a hole 92 which is sized to snugly and precisely receive the tip 88 of the spindle 86 when the cartridge 20 is inserted into the disk drive 33. Formed integrally with the upper end of the hub 91 is a circular plate 93 whose upper end includes a radially outwardly extending flange 94.

The aligner 90 is adapted to be inserted into an opening 95 (FIGS. 3 and 16) formed through the central portion of the cover 35, the diameter of the opening being substantially greater than the diameter of the flange 94. Formed integrally with and projecting radially inwardly from the lower edge portion of the opening 95 are several (e.g., eight) angularly spaced tabs 96 which underlie the flange 94 and support the aligner 90 vertically when the cartridge 20 is not in the disk drive 33. The diameter of the circle defined by the free edges of the tabs 96 is substantially greater than the diameter of the plate 93 and thus the aligner is free to float radially relative to the cover 35 as permitted by the radial clearance between the plate and the tabs.

The aligner 90 is held in assembled relation with the cover 35 by a sheet metal cap 97 (FIGS. 3 and 16) which is bonded by a ring 98 of double-sided adhesive within an enlarged counterbore 99 formed in the upper side of the cover 35. As is apparent from FIG. 16, the axial spacing between the cap 97 and the tabs 96 is significantly greater than the axial thickness of the flange 94 and thus the aligner 90 also is free to float axially relative to the cover 35.

Figure 16:
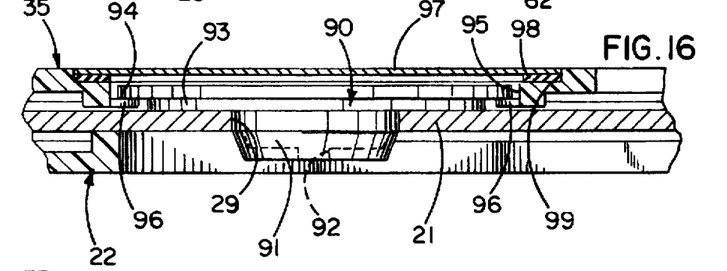
FIG. 16 is an enlarged fragmentary cross-section taken substantially along the line 16—16 of FIG. 5.

As the cover 35 is closed, the hub 91 of the aligner 90 telescopes into the hole 29 in the disk 21 and establishes a precisely concentric relationship between the disk and the hub. Prior to insertion of the cartridge into the disk drive 33, the disk rests on the base 22 of the cartridge as shown in FIG. 16 while the flange 94 rests on the tabs 96.

The cartridge 20 is inserted into the disk drive 33 by lowering the cartridge downwardly toward the pulley assembly 85 and the spindle 86. As an incident thereto, the hole 92 in the hub 91 moves into telescoped relation with the spindle 86 and, because the hub is free to float radially, the hub is brought into precise concentricity with the spindle and the pulley assembly 85. As the cartridge is lowered, the disk 21 engages and is stopped by the upper side of the pulley assembly 85 but the base 22 continues to move downwardly through a short distance so as to establish axial running clearance between the disk and the base as shown in FIG. 17. At the same time, the hub 91 engages and is stopped by the magnet 87 and, as the cover 35 continues to move downwardly, axial running clearance is established between the lower side of the flange 94 and the upper sides of the tabs 96. In the fully inserted position of the cartridge 20, the magnet 87 attracts the hub 91 and causes the disk 21 to become clamped between the lower side of the plate 93 and the upper side of the pulley assembly 85.

Accordingly, the radially floatable aligner 90 serves as a means for precisely centering the disk 21 relative to the spindle 86 and for causing the disk to become rigidly clamped to the pulley assembly 85. Because the aligner also is capable of floating axially, axial clearance is established between the disk 21 and the base 22 on the one hand and between the flange 94 and the tabs 96 on the other hand so as to prevent those components from rubbing against one another during rotation of the disk.

Figures 18, 19:
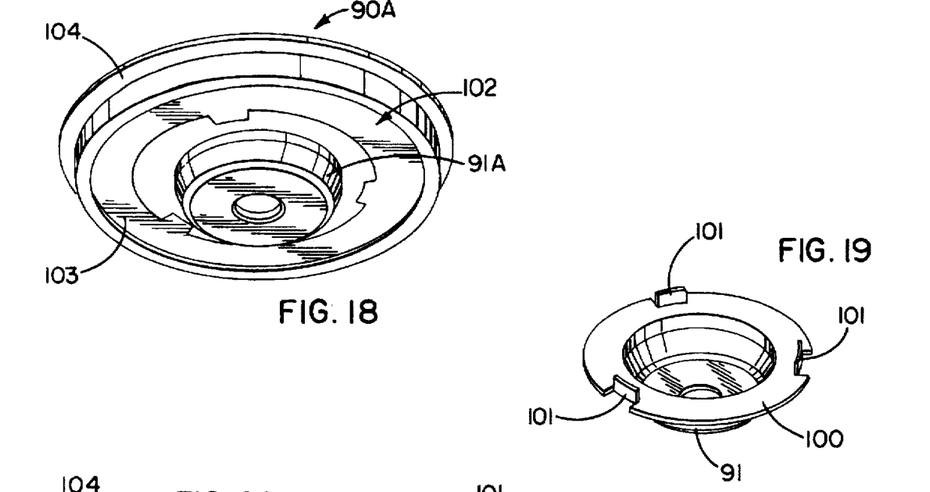
FIG. 18 is a perspective view of a modified hub assembly.
FIG. 19 is a perspective view of the hub of the assembly shown in FIG. 18.
Figure 20:
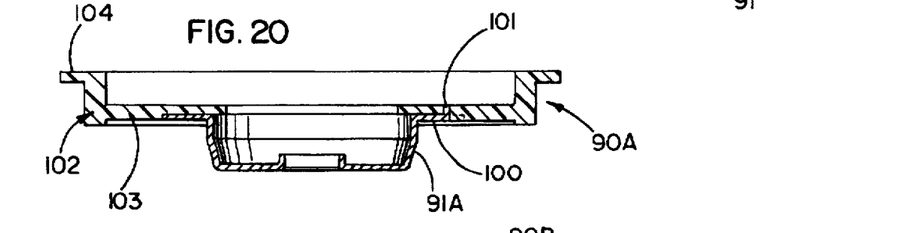
FIG. 20 is an enlarged cross-section taken axially through the hub assembly of FIG. 18.

In the embodiment of FIGS. 1–17, the aligner 90 has been disclosed as being made of a single piece of metal. Economy of manufacture, however, may be achieved by molding the aligner at least partially out of plastic. By way of example, FIGS. 18–20 show an aligner 90A in which the hub 91A is stamped from sheet metal and includes a radially outwardly projecting flange 100 with upwardly extending and angularly spaced tabs 101. The flange 100 of the hub 91A is insert molded into a plastic carrier 102 having a plate 103 and a flange 104 corresponding generally to the plate 93 and the flange 94, respectively, of the first embodiment. During the molding operation, the tabs 101 become encapsulated by and embedded in the plastic of the plate 103 in order to anchor the hub 91 to the carrier 102.

Figures 21, 22, 23:
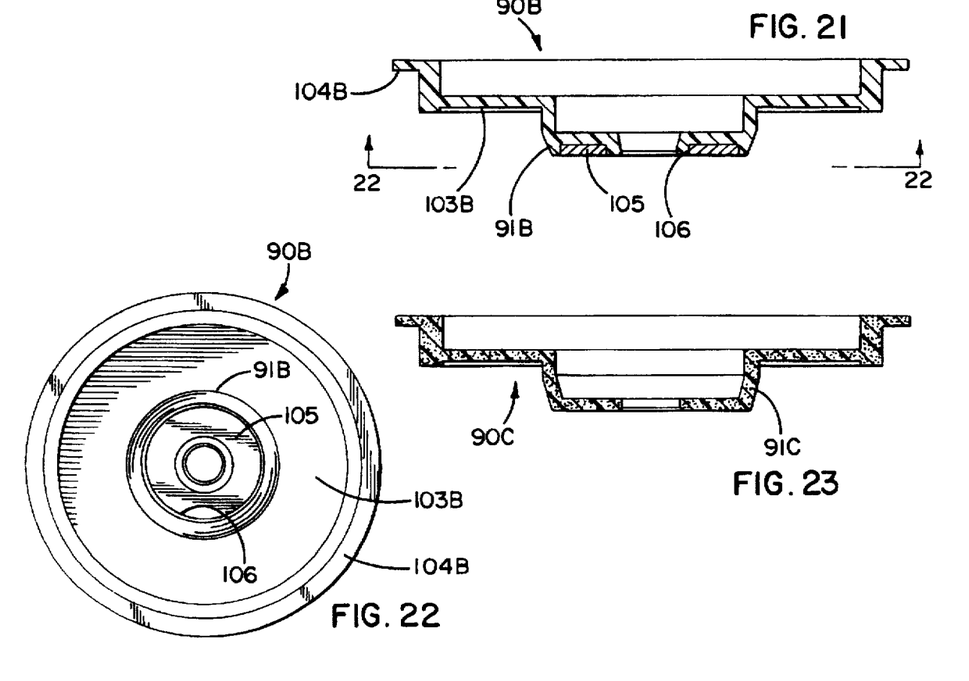
FIG. 21 is a cross-sectional view taken axially through yet another version of a hub assembly.
FIG. 22 is a bottom plan view of the hub assembly shown in FIG. 21.
FIG. 23 is a cross-sectional view taken axially through a unitary hub.

FIGS. 21 and 22 show an even less costly aligner 90B in which the hub 91B, the plate 103B and the flange 104B are formed by a one-piece unit molded of highly wear-resistant plastic. A ferromagnetic disc 105 having a central aperture 106 is affixed to the lower end of the hub either by insert molding or by adhesively bonding the disc to the hub.

The aligner 90C shown in FIG. 23 is molded entirely from wear-resistant plastic which is impregnated with ferromagnetic particles. Thus, the aligner 90C is a very inexpensive single-piece unit. If higher magnetic properties are required, a disc similar to the disc 105 may be affixed to the lower end of the hub 91C of the aligner 90C.

We claim:

1. A protective cartridge for data information disks, said cartridge comprising a base and a cover, said cover having a marginal end pivotally connected to said base for swinging movement about a predetermined axis between open and closed positions relative to said base whereby a data information disk is positionable in said base when said cover is in said open position and is enclosed by said cover and said base when said cover is in said closed position, first and second access apertures in said base and said cover, respectively, and located adjacent opposite faces of said disk, a door having a mounting portion connected to said base for relative sliding movement, said door having first and second shutters associated with said first and second access apertures, respectively, said door being slidable relative to said cover and base between a first position in which each shutter covers its associated access aperture and a second position in which each shutter exposes its associated access aperture, and said door having a hinge for supporting said second shutter for swinging movement relative to said mounting portion and said first shutter about an axis parallel with said predetermined axis wherein said second shutter is moved with said cover and relative to said mounting portion when said cover is swung between its open and closed positions.

2. A protective cartridge as defined in claim 1 in which said mounting portion includes a slider movable relative to said base and cover along a linear path extending substantially parallel to said predetermined axis, said hinge pivotally attaching said second shutter to said slider.

3. A protective cartridge as defined in claim 2 in which said base includes a track, said slider including a plastic member slidable in said track, said first shutter being a sheet metal member connected to and movable with said plastic member, said second shutter also being a sheet metal member, said sheet metal members having adjacent edges formed with interleaved curls, and said hinge including a hinge pin extending through said curls to pivotally interconnect said sheet metal members.

4. A protective cartridge as defined in claim 1 further including a generally circular aligner supported by said cover for limited radial and axial floating, said aligner having a hub which telescopes snugly into an opening in said disk when said disk is in said base and when said cover is in said closed position, said hub being of circular cross-section and having an axially facing end, and an axially extending hole formed in said hub and opening axially out of the axially facing end thereof for receiving the spindle of a rotary disk drive.

5. A protective cartridge as defined in claim 4 in which said hub is exposed by said first access aperture when said cover is in its closed position and said first shutter is in its open position.

6. A protective cartridge as defined in claim 4 in which said hub is stamped of ferromagnetic sheet metal, said aligner including a plastic carrier supported by said cover and having portions encapsulating portions of said hub.

7. A protective cartridge as defined in claim 4 in which said hub is molded of plastic, and an apertured ferromagnetic disc affixed to the axially facing end of said hub.

8. A protective cartridge as defined in claim 4 in which said hub is molded of plastic impregnated with ferromagnetic particles.

9. A protective cartridge as defined in claim 8 further including an apertured ferromagnetic disc affixed to the axially facing end of said hub.

10. A protective cartridge as defined in claim 1 in which said base is generally rectangular and includes a bottom wall and side walls extending upwardly from said bottom wall, a generally circular wall extending upwardly from said bottom wall inwardly of said side walls and defining a pocket for said disk, a portion of said circular wall being located closely adjacent a portion of one of said side walls, an upwardly opening thumb notch formed in said wall portions and defining an opening into which a thumb is insertable into engagement with the edge of said disk during removal of said disk from said base, said cover having a free edge, and a shield depending from the free edge of said cover and sized to fit into and substantially close said notch adjacent said one side wall when said cover is in said closed position.

11. A protective cartridge as defined in claim 10 in which said shield is substantially flush with said one side wall when said cover is in said closed position.

12. In combination, a data information disk having a central portion with a circular opening extending axially therethrough; a rotary drive including a spindle for rotating said disk; and a protective cartridge for said disk; said cartridge comprising a base and a cover, said cover having a marginal end pivotally connected to said base for swinging movement about a predetermined axis between open and closed positions relative to said base whereby said disk is positionable in said base when said cover is in said open position and is enclosed by said cover and said base when said cover is in said closed position, an access aperture in said base and selectively openable to permit said spindle to project into said base in generally centered relation with said opening in said disk, a generally circular aligner supported by said cover for limited radial floating movement, said aligner having a hub which telescopes snugly into said opening in said disk when said disk is in said base and when said cover is in said closed position, said hub being of circular cross-section and having an axially facing end, and an axially extending hole formed in said hub and opening out of the axially facing end thereof, said spindle being sized for telescoping snug engagement with said hole when said spindle is projected into said access aperture of said base for axially aligning said hub, said disk, and said spindle and for coacting with said hub to cause said disk to rotate about an axis coinciding precisely with the axis of said spindle.

13. The combination defined in claim 12 in which said hub includes a generally frustoconical portion which tapers in diameter upon progressing toward said axially facing end.

14. The combination defined in claim 12 in which said aligner is also capable of limited axial floating relative to said cover, said axially facing end of said hub including ferromagnetic material, said rotary drive including an annular magnet for magnetically engaging said axially facing end of said hub.

15. The combination defined in claim 14 in which said hub is stamped of ferromagnetic sheet metal, said aligner including a plastic carrier supported by said cover and having portions encapsulating portions of said hub.

16. The combination defined in claim 14 in which said hub is molded of plastic, and an apertured ferromagnetic disc affixed to the axially facing end of said hub.

17. The combination defined in claim 14 in which said hub is molded of plastic impregnated with ferromagnetic particles.

18. The combination defined in claim 17 further including an apertured ferromagnetic disc affixed to the axially facing end of said hub.

19. The combination defined in claim 12 in which said cover also includes an access aperture, a door having mounting means connected to said base and having a first shutter associated with the access aperture in said base and a second shutter associated with the access aperture in said cover, said door being slidable between a closed position in which each shutter covers its associated access aperture and an open position in which each shutter exposes its associated access aperture, and hinge means for attaching said second shutter to said mounting means and for supporting said second shutter to swing about an axis coinciding substantially with said predetermined axis whereby said second shutter may move with said door and relative to said mounting means when said cover is swung between its open and closed positions.

20. The combination defined in claim 12 in which said cover also includes an access aperture, a door having mounting means connected to said base and having a first shutter associated with the access aperture in said base and a second shutter associated with the access aperture in said cover, and said door being slidable between a closed position in which each shutter covers its associated access aperture.

21. A protective cartridge for data information disks, said cartridge comprising a base and a cover, said cover having a marginal end pivotally connected to said base for swinging about a predetermined axis between open and closed positions relative to said base whereby a data information disk is positionable in said base when said cover is in said open position and is enclosed by said cover and said base when said cover is in said closed position, first and second access apertures in said base and said cover, respectively, and located adjacent opposite faces of said disk, a door having a mounting portion connected to said base for relative sliding movement, said door having first and second shutters associated with said first and second access apertures, said shutters being disposed in overlying relation to respective outer sides of said base and cover respectively, said door being slidable relative to said cover and base between a first position in which said shutters each cover a respective one of said access apertures and a second position in which said shutters expose said access apertures, and a hinge pivotally connecting one of said shutters to said mounting portion for pivotal movement with respect to said mounting portion and said base simultaneously with pivotal movement of said cover with respect to said base.

22. A protective cartridge as defined in claim 21 in which said mounting portion includes a slider movable relative to said base and cover along a linear path extending substantially parallel to said predetermined axis, said hinge pivotally attaching said one shutter to said slider.

23. A protective cartridge as defined in claim 21 further including a generally circular aligner supported by said cover for limited radial and axial floating, said aligner having a hub which telescopes snugly into an opening in said disk when said disk is in said base and when said cover is in said closed position, said hub being of circular cross-section and having an axially facing end, and an axially extending hole formed in said hub and opening axially out of the axially facing end thereof for receiving the spindle of a rotary disk drive.

24. A protective cartridge for data information disks, said cartridge comprising a base and a cover, said cover being pivotally connected along one marginal end to said base for swinging movement about a predetermined axis between open and closed positions relative to said base whereby a data information disk is positionable in said base when said cover is in said open position and is enclosed by said cover and said base when said cover is in said closed position, first and second access apertures in said base and said cover, respectively, and located adjacent opposite faces of said disk, a door having a mounting portion connected to said cartridge for relative sliding movement, said door having first and second shutters associated with said first and second access apertures, said shutters being disposed in overlying relation to respective outer sides of said base and cover, said door being slidable relative to said cover and base between a first position in which each shutter covers a respective one of said access apertures and a second position in which said shutters expose said access apertures, and said door having a hinge pivotally connecting said shutter associated with the access opening of said cover for relative pivotal movement with respect to said mounting portion, the other of said shutters, and said base.

25. A protective cartridge as defined in claim 24 in which said shutter associated with the access opening of said cover has a pivot axis coinciding substantially with the pivot axis of said cover.

26. The protective cartridge as defined in claim 24 in which said cover and said shutter associated with the access opening of said cover are mounted for simultaneous pivotal movement with respect to said base.

* * * * *